US011365347B2

(12) United States Patent
Wong et al.

(10) Patent No.: US 11,365,347 B2
(45) Date of Patent: Jun. 21, 2022

(54) METHOD FOR PREPARATION OF PEROVSKITE QUANTUM DOT (PQD)/POLYMER/CERAMIC TERNARY COMPLEX

(71) Applicant: Nano and Advanced Materials Institute Limited, Hong Kong (HK)

(72) Inventors: Chi Hin Wong, Hong Kong (HK); Wing Yin Yung, Hong Kong (HK); Sze Chun Yiu, Hong Kong (HK); Chi Ho Kwok, Hong Kong (HK); Chenmin Liu, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 275 days.

(21) Appl. No.: 16/885,267

(22) Filed: May 28, 2020

(65) Prior Publication Data

US 2020/0385632 A1 Dec. 10, 2020

Related U.S. Application Data

(60) Provisional application No. 62/857,837, filed on Jun. 6, 2019.

(51) Int. Cl.
*C09K 11/02* (2006.01)
*C09K 11/06* (2006.01)
(Continued)

(52) U.S. Cl.
CPC ............ *C09K 11/025* (2013.01); *C09K 11/06* (2013.01); *B82Y 20/00* (2013.01); *B82Y 40/00* (2013.01)

(58) Field of Classification Search
CPC ........ C09K 11/025; C09K 11/06; B82Y 20/00
See application file for complete search history.

(56) References Cited

U.S. PATENT DOCUMENTS 7,291,394 B2 11/2007 Winkler et al.
11,121,290 B2 * 9/2021 Kwok .................. H01L 33/505
2019/0002759 A1 1/2019 D'Amico et al.

FOREIGN PATENT DOCUMENTS

CN 108051948 A 5/2018
CN 107603614 B 5/2019
(Continued)

OTHER PUBLICATIONS

John Patrick Murphy, Novel Hybrid Perovskite Composites and Microstructures: Synthesis and Characterization, Graduate Theses & Non-Theses, Montana Tech Library, May 5, 2018.
(Continued)

*Primary Examiner* — Mark V Prenty

(57) ABSTRACT

A method for preparation of perovskite quantum dot (PQD)/polymer/ceramic ternary complex includes encapsulation of bifunctional coating including ceramic and polymer. Encapsulation sequence of polymer and ceramic may be altered according to the application. In one scenario, the perovskite quantum dots may be protected with ceramic coating first and further coated with polymer to obtain the perovskite/ceramic/polymer ternary complex. In another scenario, the perovskite quantum dots may be protected with polymer coating first and followed by ceramic coating to obtain the perovskite/polymer/ceramic ternary complex. The PQD ternary complex may provide synergistic effect on improvement of stability towards heat and moisture when compared to existing technology.

26 Claims, 14 Drawing Sheets
(2 of 14 Drawing Sheet(s) Filed in Color)

(51) Int. Cl.
*B82Y 40/00* (2011.01)
*B82Y 20/00* (2011.01)

(56) References Cited

FOREIGN PATENT DOCUMENTS

| | | |
|---|---|---|
| CN | 108128004 B | 10/2019 |
| WO | 2019200940 A1 | 10/2019 |

OTHER PUBLICATIONS

Kootak Hong et al., Low-dimensional halide perovskites: Review and issues, Journal of Materials Chemistry C, Jan. 30, 2018.

Ying-Chieh Wong et al., Perovskite-Initiated Photopolymerization for Singly Dispersed Luminescent Nanocomposites, Advanced Materials, 2018, 1800774.

Rounak Naphade et al., Hybrid Perovskite Quantum Nanostructures Synthesized by Electrospray Antisolvent-Solvent Extraction and Intercalation, ACS Applied Materials & Interfaces, 2016, pp. 854-861, vol. 8.

Yanan Wang et al., Ultrastable, Highly Luminescent Organic-Inorganic Perovskite-Polymer Composite Films, Advanced Materials, 2016, 201603964.

* cited by examiner

401
dissolving a polymer and precursors in an aprotic solution in order to prepare a precursor/polymer solution, wherein the precursors weight percentage ranges from 1-20%

402
performing an electric field assisted extrusion of the precursor/polymer solution in order to form a liquid jet, wherein the liquid jet is collected over a surface to form a polymer film

403
removing an excess aprotic solvent from the polymer film in order to obtain a thin film of a perovskite quantum dots/ polymer, wherein a thickness of the thin film of the perovskite quantum dots/polymer ranges from 50-300 μm

404
grinding, via cryomilling, the thin film of the perovskite quantum dots/polymer in order to obtain the perovskite quantum dots/polymer powder with a size ranging from 0.1 to 50 μm

405
depositing a ceramic coating with a thickness ranging from 10 – 50 nm on the perovskite quantum dots/polymer powder in order to obtain the perovskite quantum dot (PQD)/polymer/ceramic composite ternary complex

Fig. 4

METHOD FOR PREPARATION OF PEROVSKITE QUANTUM DOT (PQD)/POLYMER/CERAMIC TERNARY COMPLEX

CROSS-REFERENCE TO RELATED APPLICATIONS AND PRIORITY

The present application claims priority from U.S. Provisional Patent Application No. 62/857,837 filed on Jun. 6, 2019, the entirety of which is incorporated herein by reference.

TECHNICAL FIELD

The present application described herein, in general, relates to a method for preparation of perovskite quantum dot (PQD)/polymer/ceramic ternary complex.

BACKGROUND

Perovskite is a calcium titanium oxide ($CaTiO_3$) mineral, which was discovered by a Russian mineralogist Lev Perovski in 1989. Lot of research has been done pertaining to this structure specifically by introducing different cation/anion into the structures which has resulted in development of various novel engineered materials. Owing to this unique structure, this class of materials with similar crystal structure is so called as the perovskite structure ($ABX_3$). Perovskite structure has a general chemical formula $ABX_3$ with A and B are cations where A is sufficiently larger than B, and wherein X is an anion bonded to both A and B. The ideal (undistorted) perovskite structure with A cation surrounded by 12-fold coordination with a cuboctahedron of anions and B cation surrounded by 6-fold coordination with an octahedron of anions.

Recently, the perovskite has become more popular in different aspect of materials science due to its unique physical properties including photo-responsive, superconductivity, magnetoresistance, ionic conductivity, and the like. Furthermore, the perovskite semiconductor materials such as cesium lead halide and organoammonium lead halide in photovoltaics have gained significant importance because of their interesting properties including high efficiency, superior optical properties and all-solution-process. These properties allow the perovskite quantum dots to be applied in different photovoltaic devices such as solar cell, electroluminescence and photoluminescence. However, there are several drawbacks that have been observed in the conventional perovskite quantum dots which remains to be addressed. Few of the drawbacks includes:
i. Thermal stability of perovskite quantum dots.
ii. Moisture resistivity of perovskite quantum dots.
iii. Post treatment after perovskite application (solubility problem).
iv. Incompatibility of perovskite quantum dots in various solvent.

Thus, there is a long-standing need of a method for preparation of perovskite quantum dot (PQD)/polymer/ceramic ternary complex and perovskite quantum dot (PQD)/ceramic/polymer ternary complex that alleviates the drawbacks observed in the art.

SUMMARY

This summary is provided to introduce concepts related to a method for preparation of perovskite quantum dot (PQD)/polymer/ceramic ternary complex and perovskite quantum dot (PQD)/ceramic/polymer ternary complex and the concepts are further described below in the detailed description. This summary is not intended to identify essential features of the claimed subject matter nor it is intended for use in determining or limiting the scope of the claimed subject matter.

In one implementation, a method for preparation of perovskite quantum dot (PQD)/polymer/ceramic ternary complex is disclosed. The method may include a step of dissolving precursors in an aprotic solvent in order to form a precursor solution. The method may further include a step of spraying the precursor solution into an anti-solvent containing a polymer in order to obtain a mixture. The method may further include a step of drying the mixture, under heat and vacuum, to remove an excess aprotic solvent from the mixture for obtaining a dry perovskite quantum dots/polymer composite. The method may further include a step of grinding the dry perovskite quantum dots/polymer composite, via cryomilling, in order to obtain a PQD/polymer powder. The method may further include a step of coating the PQD/polymer powder with ceramic using sol-gel reaction for obtaining a PQD/polymer/ceramic ternary complex powder.

In some embodiments, the precursor may include at least one of a group IV metal halide, methylammonium/cesium halide, a structure directing agent and stabilizing agent, wherein the group IV metal halide may include at least one of $PbCl_2$, $PbBr_2$ and $PbI_2$, wherein the methylammonium/cesium halide may include at least one of methylammonium chloride, methylammonium bromide and methylammonium iodide, cesium chloride, cesium bromide and cesium iodide, and wherein the structure directing agent and stabilizing may include one of oleylamine, oleic acid, myristic acid, and stearic acid.

In some embodiments, the precursor solution may be ultrasonicated for 15 min with 240-480 W sonication power.

In some embodiments, the total amount of the precursor by weight percentage is in the range from 1-20%, of the mixture.

In some embodiments, the aprotic solvent may be selected from N,N-dimethylformamide and acetonitrile.

In some embodiments, the anti-solvent containing polymer may be obtained by dissolving the anti-solvent into a polymer substrate at a temperature ranging from 25° C. to 70° C.

In some embodiments, the anti-solvent may be selected from hexane, cyclohexane, ethyl acetate, chloroform, dichloromethane, toluene, and xylene.

In some embodiments, the polymer may be selected from poly(methyl methacrylate), poly(ethyl methacrylate), and poly(ethylene terephthalate).

In some embodiments, the dry perovskite quantum dots/polymer composite may be hot pressed at a temperature ranging from 100° C.-150° C. based upon polymer substrate.

In some embodiments, the dry perovskite QD/polymer composite may be grinded, in a cryo-mill, to the PQD/polymer powder, with a particle size ranging from 0.1-50 µm, wherein grinding ball size of cryo-mill may range from 1-10 mm and grinding time may range from 3-10 min.

In some embodiments, the thickness of the thin film of the perovskite quantum dots/polymer composite may be in a range of 100-250 µm in a display application.

In some embodiments, the coating of the ceramic on the PQD/polymer powder may be configured to resist the deformation of a structure of the perovskite quantum dots/polymer and to promote the environmental stability.

In some embodiments, the ceramic, for coating, may be at least one of silica, alumina, and kaolinite, wherein the ceramic may be coated with a reverse micelle method in the presence of surfactant and catalysed with weak base, wherein the thickness of ceramic coating ranges from 10-50 nm, and wherein the thickness may be controlled in order to provide optimal protecting effect towards perovskite/polymer composite.

In some embodiments, the ceramic coating may be further modified with a single layer of a silane-type ligands selected from a group consisting of (3-aminopropyl)triethoxy silane, triethoxy(octyl)silane, triethoxycaprylsilane, and 3-(Trimethoxysilyl)propyl methacrylate, wherein the silane-type ligand may exhibit a crosslinking effect with the adhesive matrix selected from a group consisting of epoxy, acrylate and silicone in order to promote the stability of ternary complex towards heat, moisture and high intensity blue light.

In some embodiments, the perovskite quantum dot (PQD)/polymer/ceramic ternary complex powder may be mixed with thermal/UV curable adhesive, wherein the perovskite quantum dot (PQD)/polymer/ceramic ternary complex powder containing adhesive may be dispensed on LED chip for light conversion in the display application.

In another implementation, a method for preparation of perovskite quantum dot (PQD)/ceramic/polymer composite ternary complex, is disclosed. The method may include a step of dissolving precursor in an aprotic solvent in order to form a precursor solution. The method may further include a step of spraying the precursor solution into an anti-solvent containing a ceramic precursor in order to obtain a perovskite QD/ceramic matrix, wherein a coating of the ceramic ranges from 10-50 nm. The method may further include a step of suspending the perovskite QD/ceramic matrix into a polymer matrix with a weight percentage ranging from 1-20% in order to obtain a mixture. The method may further include a step of removing an excess aprotic solvent from the mixture, to obtain a perovskite QD/ceramic/polymer composite. The method may further include a step of grinding the perovskite QD/ceramic/polymer composite, via cryomilling, in order to obtain a perovskite QD/ceramic/polymer composite ternary complex powder.

In some embodiments, the precursor may comprise at least one of a group IV metal halide, methylammonium/cesium halide, a structure directing agent and stabilizing agent, wherein the group IV metal halide comprises at least one of PbCl2, PbBr2 and PbI2, wherein the methylammonium/cesium halide may comprise at least one of methylammonium chloride, methylammonium bromide and methylammonium iodide, cesium chloride, cesium bromide and cesium iodide, and wherein the structure directing agent and stabilizing may be one of oleylamine, oleic acid, myristic acid, and stearic acid.

In some embodiments, the aprotic solvent may be selected from N,N-dimethylformamide or acetonitrile.

In some embodiments, the anti-solvent may be selected from a group consisting of hexane, cyclohexane, ethyl acetate, chloroform, dichloromethane, toluene, and xylene.

In some embodiments, the ceramic precursor may be selected from a group consisting of tetraethyl orthosilicate, tetramethyl orthosilicate, and 3-(trimethoxysilyl)propyl methacrylate, wherein a mixture of the precursor solution and the anti-solvent containing the ceramic precursor may be incubated at 25° C.-60° C. for 1-72 hours after spraying of the precursor solution in order to facilitate the growth of ceramic layer.

In some embodiments, the polymer may be selected from a group consisting of poly(methyl methacrylate), poly (ethyl methacrylate), and poly(ethylene terephthalate).

In some embodiments, the particle size, of the perovskite QD/ceramic/polymer composite ternary complex powder, may range from 0.1-50 μm, wherein the grinding ball size, of the cryo-mill, ranges from 1-10 mm and grinding time ranges from 3-10 min.

In yet another implementation, a method for preparation of perovskite quantum dot (PQD)/polymer/ceramic ternary complex is disclosed. The method may include a step of dissolving a polymer and precursors in an aprotic solution in order to prepare a precursor/polymer solution, wherein the precursors weight percentage may range from 1-20%. The method may further include a step of performing an electric field assisted extrusion of the precursor/polymer solution in order to form a liquid jet, wherein the liquid jet may be collected over a surface. The method may further include a step of removing an excess aprotic solvent from the liquid jet in order to obtain a thin film of a perovskite quantum dots/polymer, wherein a thickness of the thin film of the perovskite quantum dots/polymer may range from 50-300 μm. The method may further include a step of grinding, via cryomilling, the thin film of the perovskite quantum dots/polymer in order to obtain a PQD/polymer powder with a particle size ranging from 0.1 to 50 μm. The method may further include a step of depositing a ceramic coating with a thickness ranging from 10-50 nm on the perovskite quantum dots/polymer powder in order to obtain the perovskite quantum dot (PQD)/polymer/ceramic composite ternary complex.

In some embodiments, the thickness of polymer film may be varied by varying the parameters of the polymer selected from a group comprising polymer properties, precursor solution properties and instrument properties.

In some embodiments, the polymer may be selected from polyvinylidene difluoride (PVDF), polyurethane (PU), and polyvinyl alcohol (PVA), wherein the polymer with a molecular weight range of 50,000-500,000 may be dissolved in the aprotic solvent in order to form a polymer solution, wherein the aprotic solvent may be at least one of dimethylformaide, tetrahydrofuran, and chloroform.

In some embodiments, the aprotic solvent may be selected from dimethylformamide, acetone, and acetonitrile.

In some embodiments, the precursor may include at least one of a group IV metal halide, methylammonium/cesium halide, a structure directing agent and stabilizing agent, wherein the group IV metal halide may include at least one of $PbCl_2$, $PbBr_2$ and $PbI_2$, wherein the methylammonium/cesium halide may include one of methylammonium chloride, methylammonium bromide and methylammonium iodide, cesium chloride, cesium bromide and cesium iodide, and wherein the structure directing agent and stabilizing agent may include one of oleylamine, oleic acid, myristic acid, and stearic acid.

In some embodiments, a concentration of the polymer solution may be in range of 1-20% for electrospinning and the viscosity may be at the range of 1000-2000 cps, and wherein a potential difference for electrospinning may be at range of 15-40 kV with the flow rate of the precursor solution may be at range of 0.1-3.5 mL/min.

In one aspect, grinding of polymer composite may be performed by cryomilling and particle size, of the powdered polymer composite, may be controlled at 0.1-1 μm by employing different grinding ball size in range of 1 to 10 mm and the grinding time range may be 3-10 min.

In some embodiments, the coating of the ceramic may be selected from at least one of the silica, alumina, kaolinite coated with a reverse micelle method in the presence of surfactant and catalysed with weak base, wherein the thickness of ceramic coating, ranging from 10-50 nm, may be controlled in order to provide optimal protecting effect towards perovskite/polymer composite.

In some embodiments, the perovskite quantum dot (PQD)/polymer powder may be mixed with thermal/UV curable adhesive, wherein the perovskite quantum dot (PQD)/polymer powder containing adhesive may be dispensed on chips in order to promote the environmental stability.

In some embodiments, perovskite quantum dots/polymer powder may be modified with sol-gel reaction to deposit the ceramic coating, wherein the ceramic coating may be configured to resist the deformation of a structure of the perovskite quantum dots/polymer and to promote the environmental stability.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures.

FIG. 4 illustrates a method for preparation of perovskite quantum dot (PQD)/polymer/ceramic ternary complex, in accordance with a third embodiment of the present application.

DETAILED DESCRIPTION

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

The present application generally relates to method(s) for preparation of perovskite quantum dot ternary complex with encapsulation of bifunctional coating comprising ceramic and polymer. Encapsulation sequence of the polymer and the ceramic may be altered according to the application. The weight percentage of perovskite QD in polymer may range from 1-20% and the thickness of ceramic coating may range from 10-50 nm in order to prepare a PQD ternary complex. The PQD ternary complex may provide synergistic effect on improvement of stability towards heat and moisture when compared to existing technology.

The present application generally relates to obtaining a perovskite quantum dot (PQD)-polymer composites by co-operating the perovskite quantum dots (PQD) into polymer and further process with heat post-treatment. According to embodiments of the present application, the PQD may be protected by the polymer layer and fascinate the process for further treatment. According to embodiments of the present application, the perovskite quantum dots may be prepared simultaneously with the formation of polymer composite, which may highly reduce the time and cost for purification of the product.

Figure 1:
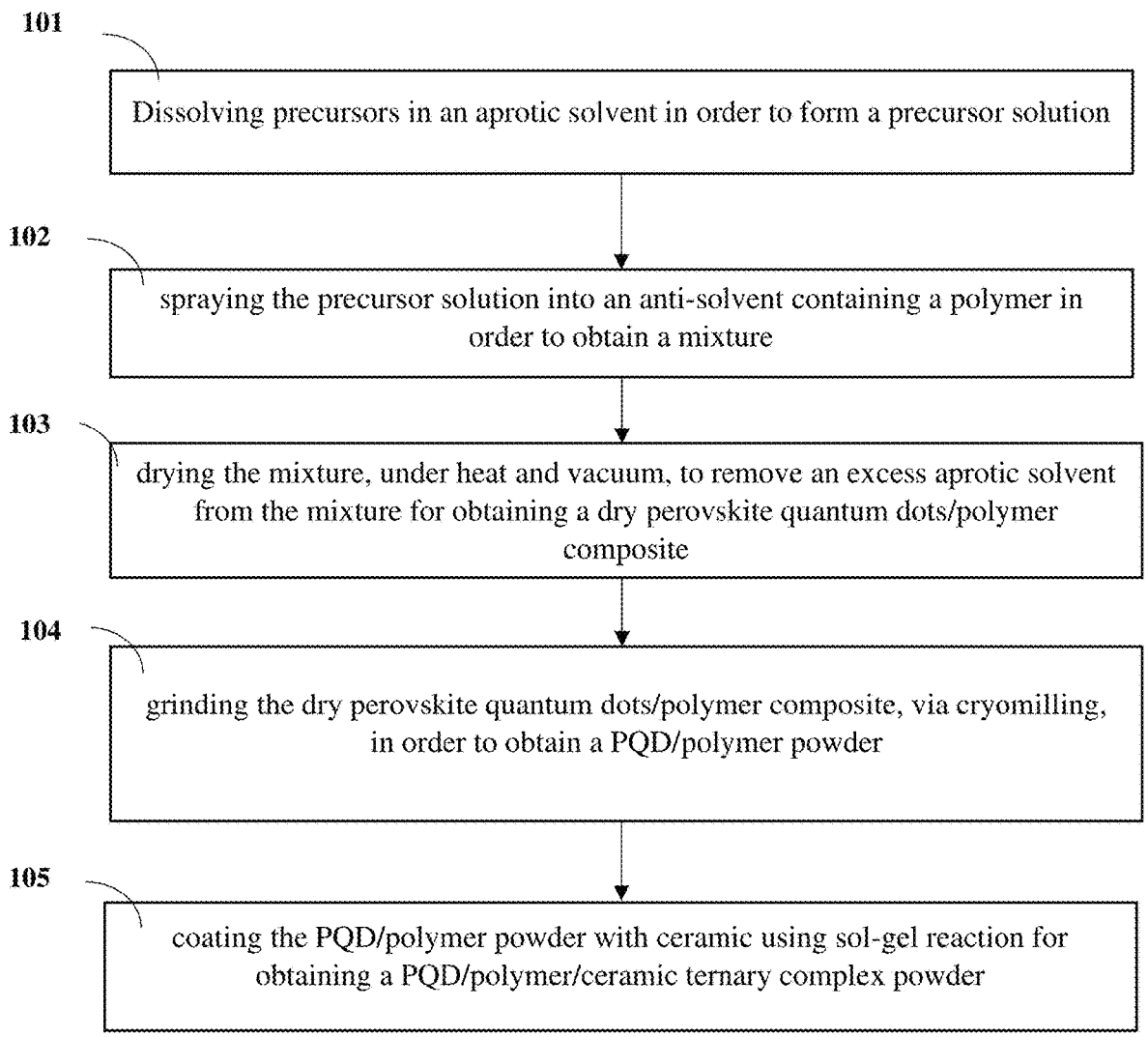
FIG. 1 illustrates a method for preparation of perovskite quantum dot (PQD)/polymer/ceramic ternary complex, in accordance with a first embodiment of the present application.

According to the first embodiments of the present application, the method for preparation of perovskite quantum dot (PQD)/polymer/ceramic ternary complex using a hot press treatment process is illustrated in FIG. 1. At step 101, precursors may be dissolved in an aprotic solvent in order to form a precursor solution. The precursor solution may be mixed under ultrasonication in order to perform complete dissolution of the precursor in the aprotic solvent. In one exemplary embodiment, the precursor solution may be ultrasonicated for 15 min with 240-480 W sonication power. According to embodiments of the present application, the precursors may include at least one of, but not limited to, a group IV metal halide, methylammonium/cesium halide, a structure directing agent and stabilizing agent. In one embodiment, the group IV metal halide may include $PbCl_2$, $PbBr_2$ and $PbI_2$. In one embodiment, the methylammonium/cesium halide may include, but not limited to. methylammonium chloride, methylammonium bromide and methylammonium iodide, cesium chloride, cesium bromide and cesium iodide. In one embodiment, the structure directing agent and stabilizing agent may include, but not limited to, oleylamine, oleic acid, myristic acid, and stearic acid. According to embodiments of the present application, the aprotic solvent may be selected from, but not limited to, N,N-dimethylformamide or acetonitrile. In one embodiment, the polymer may be selected from, but not limited to, poly(methyl methacrylate), poly(ethyl methacrylate), or poly(ethylene terephthalate). At step 102, the precursor solution may be sprayed into an anti-solvent containing a polymer in order to obtain a mixture. The anti-solvent containing the polymer may be obtained by dissolving the anti-solvent into a polymer substrate at a temperature from 25° C.-70° C. According to embodiments of the present application, the anti-solvent may be selected from, but are not limited to, hexane, cyclohexane, ethyl acetate, chloroform, dichloromethane, toluene, or xylene.

At step 103, the mixture may be dried under heat and vacuum in order to remove an excess aprotic solvent from the mixture for obtaining a dry perovskite quantum dot/polymer composite. In one exemplary embodiment, the excess aprotic solvent may be removed by reduced pressure rotary evaporation to obtain the dry perovskite quantum dots/polymer composite. In one exemplary embodiment, the dry perovskite quantum dots/polymer composite may be a polymer lump.

In one embodiment, a hot press treatment is performed on the dry perovskite quantum dots/polymer composite at a temperature range of 100° C.-150° C. based on the polymer substrate, in order to obtain a thin film of the perovskite quantum dots/polymer composite.

Figure 2:
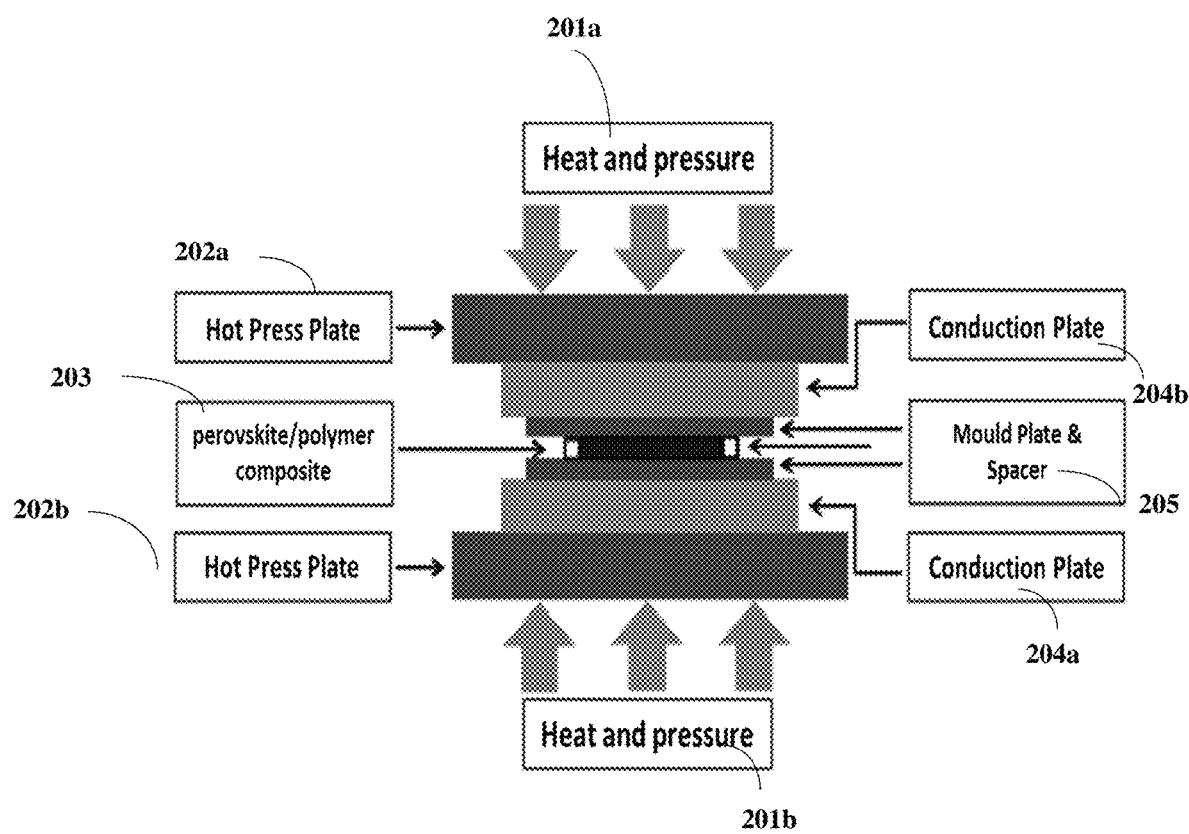
FIG. 2 illustrates a hot press treatment of the perovskite/polymer composite, in accordance with an embodiment of the present application.

Now referring to FIG. 2, the hot press treatment of the perovskite/polymer composite is illustrated, in accordance with an embodiment of the present application. The hot press treatment includes an arrangement including a pair of a hot press plate 202a and 202b, a pair of conduction plate 204a and 204b and a mould plate and spacer 205. According to embodiments of the present application, heat and pressure 201a-201b is applied on the perovskite quantum dots/polymer composite through the pair of the hot press plate 202a and 202b. In one embodiment, the perovskite quantum dots/polymer composite may be held by the mould plate and spacer 205. The hot press treatment may allow further rearrangement of the perovskite quantum dots into better conformation and hence into better quantum efficiency. In one exemplary embodiment, the quantum efficiency of the perovskite quantum dots/polymer composite may be promoted by the hot press treatment at an optimized temperature based on the nature of the polymer. In one exemplary embodiment, the optimized temperature may be slightly higher than the glass transition temperature of the polymer. In one exemplary embodiment, the thickness of thin film of the perovskite quantum dots/polymer composite is in a range of 100-250 µm for display application.

Referring back to FIG. 1, at step 104, the dry perovskite quantum dots/polymer composite may be grinded in order to obtain a PQD/polymer powder. According to embodiments of the present application, grinding of polymer composite is performed by cryomilling. In one embodiment, PQD/polymer powder particle size is controlled at 0.1-50 µm by employing different grinding ball size in a range of 1 to 10 mm and the grinding time range is 3-10 min.

At step 105, the PQD/polymer powder is coated with ceramic using sol-gel reaction for obtaining a PQD/polymer/ceramic ternary complex powder. According to embodiments of the present application, the ceramic used for the coating may be at least one of silica, alumina, and kaolinite. The ceramic may be coated with a reverse micelle method in the presence of surfactant and catalysed with weak base. The thickness of the ceramic coating may range from 10-50 nm. The thickness of ceramic coating may be controlled for providing an optical protecting effect towards perovskite/polymer composite. In one embodiment, the coating of the ceramic on the PQD/polymer powder may be configured to resist the deformation of a structure of the perovskite quantum dots/polymer and to promote the environmental stability. In one embodiment, the ceramic coating may be further modified with a single layer of a silane-type ligands selected from a group consisting of (3-aminopropyl)triethoxysilane, triethoxy(octyl)silane, and triethoxycaprylsilane, 3-(Trimethoxysilyl)propyl methacrylate. The silane-type ligand may exhibit a crosslinking effect with the adhesive matrix selected from a group consisting of epoxy, acrylate and silicone in order to promote the stability of ternary complex towards heat, moisture and high intensity blue light.

According to embodiments of the present application, the perovskite quantum dot (PQD)/polymer/ceramic ternary complex powder may be mixed with thermal/UV curable adhesive. The perovskite quantum dot (PQD)/polymer/ceramic ternary complex powder containing adhesive may be dispensed on LED chip for light conversion in the display application.

Figure 3:
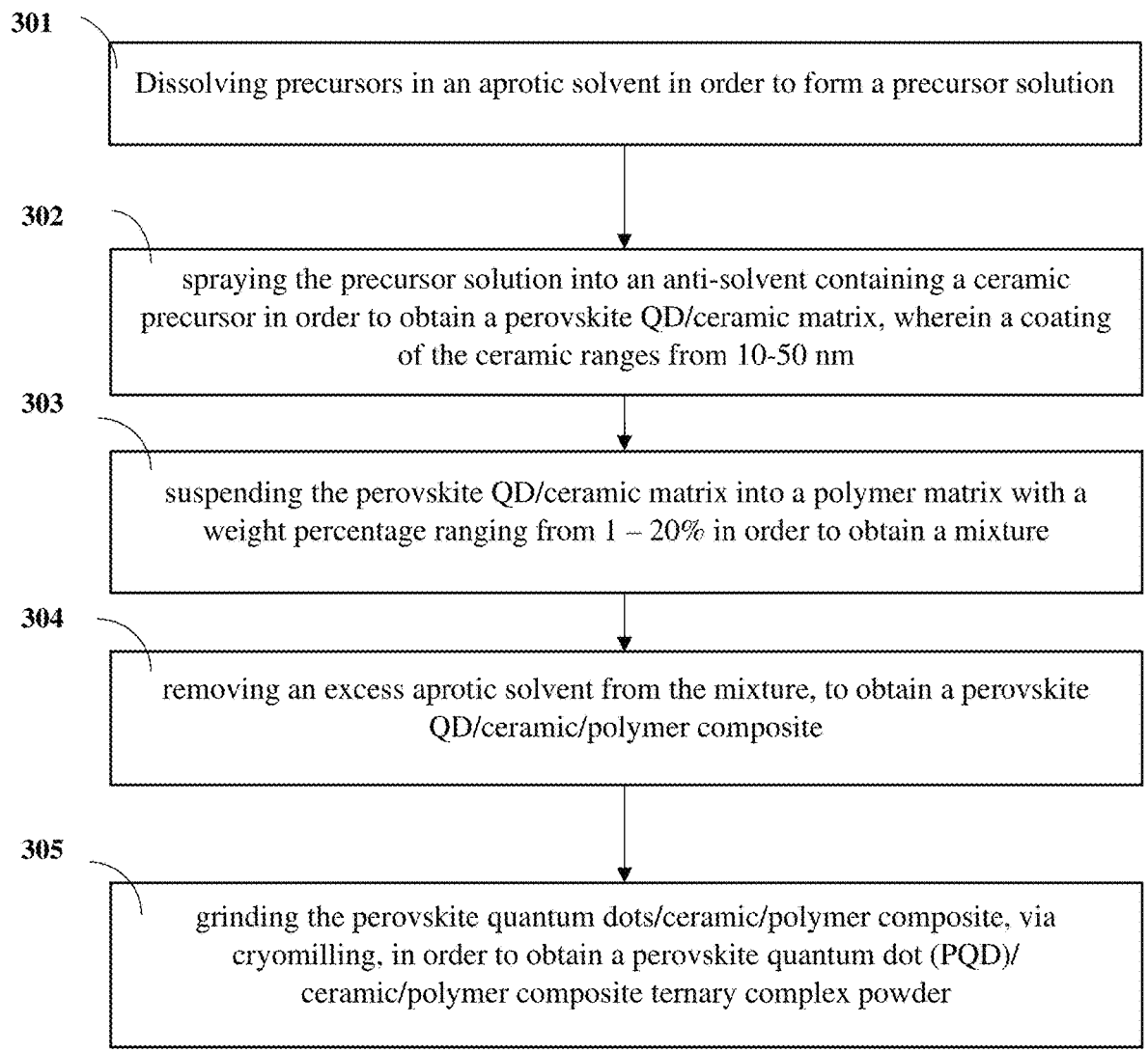
FIG. 3 illustrates a method for preparation of perovskite quantum dot (PQD)/ceramic/polymer ternary complex, in accordance with a second embodiment of the present application.

According to the second embodiment of the present application, a method for preparation of perovskite quantum dot (PQD)/ceramic/polymer ternary complex is illustrated in FIG. 3. At step 301, the precursors may be dissolved in an aprotic solvent in order to form a precursor solution. According to embodiments of the present application, the precursors may include at least one of, but not limited to, a group IV metal halide, methylammonium/cesium halide, a structure directing agent and stabilizing agent. In one embodiment, the group IV metal halide may include $PbCl_2$, $PbBr_2$ and $PbI_2$. In one embodiment, the methylammonium/cesium halide may include, but not limited to, methylammonium chloride, methylammonium bromide and methylammonium iodide, cesium chloride, cesium bromide and cesium iodide. In one embodiment, the structure directing agent and stabilizing agent may include, but not limited to, oleylamine, oleic acid, myristic acid, and stearic acid. According to embodiments of the present application, the aprotic solvent may be selected from, but not limited to, N,N-dimethylformamide or acetonitrile. In one embodiment, the polymer may be selected from, but not limited to, poly (methyl methacrylate), poly (ethyl methacrylate), or poly (ethylene terephthalate).

At step 302, the precursor solution may be sprayed into the anti-solvent containing the ceramic precursor in order to obtain a perovskite QD/ceramic matrix. The coating of ceramic may range from 10-50 nm. The anti-solvent may be selected from a group consisting of, but not limited to, hexane, cyclohexane, ethyl acetate, chloroform, dichloromethane, toluene, and xylene. According to embodiment of the present application, the ceramic precursor may be selected from a group consisting of, but not limited to, tetraethyl orthosilicate, tetramethyl orthosilicate, and 3-(trimethoxysilyl)propyl methacrylate. In one exemplary embodiment, a mixture of the precursor solution and the anti-solvent containing the ceramic precursor may be incubated at 25° C.-60° C. for 1-72 hours after spraying of the precursor solution in order to facilitate the growth of ceramic layer.

At step 303, the perovskite QD/ceramic matrix may be suspended into a polymer matrix with a weight percentage ranging from 1-20% in order to obtain a mixture. In one embodiment, the polymer may be selected from a group consisting of, but not limited to, poly(methyl methacrylate), poly (ethyl methacrylate), and poly(ethylene terephthalate).

At step 304, the excess aprotic solvent may be removed from the mixture to obtain a perovskite QD/ceramic/polymer composite.

At step 305, the perovskite QD/ceramic/polymer composite may be grinded, via cryomilling, in order to obtain a perovskite quantum dot (PQD)/ceramic/polymer composite ternary complex powder. The cryomilling process may employ grinding ball size ranging from 1-10 mm and grinding time ranging from 3-10 min. In one embodiment, particle size of the perovskite QD/ceramic/polymer composite ternary complex powder may range from 0.1-50 μm.

According to the third embodiment of the present application, a method for preparation of perovskite quantum dot (PQD)/polymer/ceramic ternary complex using an electrospinning process is illustrated in FIG. 4. At step 401, a precursor is dissolved a polymer and an aprotic solvent in order to prepare a precursor/polymer solution. The precursor weight percentage may range from 1-20%. In one embodiment, the polymer may be selected from, but not limited to, polyvinylidene difluoride (PVDF), polyurethane (PU), polyvinyl alcohol (PVA). In one exemplary embodiment, the polymer with a molecular weight range of 50,000-500,000 may be dissolved in the aprotic solvent in order to form a polymer solution. In one embodiment, the aprotic solvent may be at least one of, but not limited to, dimethyl formamide, tetrahydrofuran, or chloroform. In another embodiment, the aprotic solvent may be selected from, but not limited to, dimethyl formamide, acetone, or acetonitrile. According to embodiments of the present application, the precursor may include at least one of, but not limited to, a group IV metal halide, methylammonium/cesium halide, a structure directing agent and stabilizing agent. In one embodiment, the group IV metal halide may include $PbCl_2$, $PbBr_2$ and $PbI_2$. In one embodiment, the methylammonium/cesium halide may include, but not limited to, methylammonium chloride, methylammonium bromide and methylammonium iodide, cesium chloride, cesium bromide and cesium iodide. In one embodiment, the structure directing agent and stabilizing agent may include, but not limited to, oleylamine, oleic acid, myristic acid, and stearic acid.

Figure 5:
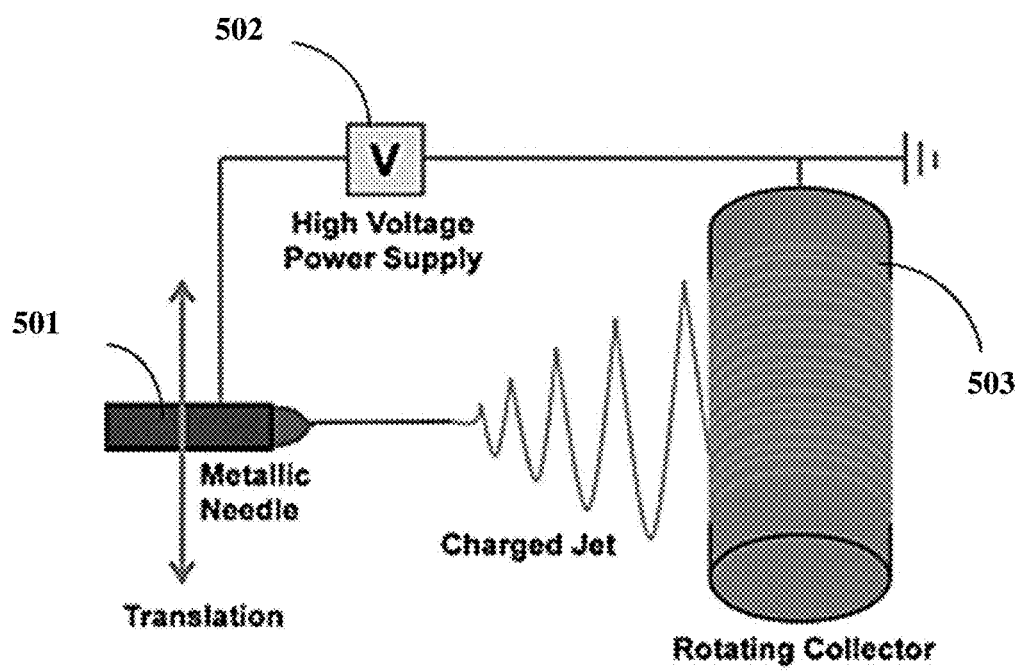
FIG. 5 illustrates an electric field assisted extrusion process, in accordance with an embodiment of the present application.

At step 402, an electric field assisted extrusion of the precursor/polymer solution may be performed in order to form a liquid jet. The liquid jet may be collected over a surface. Now referring to FIG. 5, the electric field assisted extrusion process, is illustrated in accordance with the embodiment of the present application. The precursor/polymer solution is transferred to a syringe or metallic needle 501. Further, a sufficiently high voltage is applied using a high voltage power supply 502 in the field assisted extrusion system in order to allow the polymer solution to charge up. In one exemplary embodiment, a concentration of the polymer solution is in range of 1-20% for electrospinning and the viscosity is at the range of 1000-2000 cps. The droplet of the polymer solution is stretched, and forms charged liquid jet, due to counteractions between electrostatic repulsion and surface tension. The liquid jet is elongated and deposited on the grounded collector 503, due to a potential difference. In one embodiment, the potential difference for electrospinning is at range of 15-40 kV with the flow rate of the precursor solution is at range of 0.1-3.5 mL/min.

Referring back to FIG. 4, at step 403, an excess solvent from the liquid jet may be removed in order to obtain a thin film of a perovskite quantum dots/polymer. In one embodiment, the thickness of the thin film of the perovskite quantum dots/polymer ranges from 50-300 μm. In one exemplary embodiment, the excess solvent from the liquid jet may be removed during electrospinning and the perovskite is assembled on the surface of the polymer to fabricate a thin film of a perovskite quantum dots/polymer composite. In one exemplary embodiment, during the electrospinning, the liquid jet is dried out and the perovskite is assembled on the surface of the polymer fiber due to the loss of solvent. Therefore, the perovskite cooperated nanofiber may be fabricated simultaneously. Furthermore, the perovskite nanofiber may be further annealed to promote the quantum efficiency and stability. As the perovskite encapsulated with the polymer promotes the environmental stability, the thin film of the perovskite quantum dots/polymer composite may be applied directly to work as a color conversion layer in display module for color gamut and luminescence promotion. In one exemplary embodiment, the thin film of the perovskite quantum dots/polymer composite may be used as color enhancement film to improve the green color and red color in the traditional display.

At step 404, the thin film of the perovskite quantum dots/polymer composite is grinded in order to obtain a PQD/polymer powder with a particle size ranging from 0.1 to 50 μm. In one exemplary embodiment, the thin film of the perovskite/polymer composite may be grinded by cryomilling process. The particle size of the PQD/polymer powder may be fine-tuned by using different size of grinding balls and grinding time. In one exemplary embodiment, the particle size of the PQD/polymer powder is controlled at 0.1-50 μm by employing different grinding ball size in range of 1 to 10 mm and the grinding time range is 3-10 min. In one exemplary embodiment, the PQD/polymer powder may be further mixed with adhesive including but not limited to silicone elastomer, epoxy, UV curable acrylate for different applications such as dispensing on chips which may promote environmental stability.

At step 405, a ceramic coating with a thickness ranging from 10-50 nm may be deposited on the perovskite quantum dots/polymer powder in order to obtain the perovskite quantum dot (PQD)/polymer/ceramic composite ternary complex. The PQD/polymer powder may be modified with sol-gel reaction in order to deposit the ceramic coating on PQD/polymer powder for obtaining a PQD/polymer/ceramic ternary complex powder. The ceramic coating may be configured to resist the deformation of a structure of the perovskite quantum dots/polymer and to promote the environmental stability. In one embodiment, the PQD/polymer powder may be dispersed in a co-solvent system in presence of surfactant for the sol-gel reaction. The coating of the ceramic may be selected from at least one of the silica, alumina, kaolinite coated with a reverse micelle method in the presence of surfactant and catalysed with weak base. The thickness of ceramic coating ranging from 10-50 nm may be controlled in order to provide optimal protecting effect towards perovskite/polymer composite. In one exemplary embodiment, the micelle formed may be further coated with silica by addition of silica precursor and base. In one embodiment, formation of micelle is achieved by addition of surfactant including but not limited to IGEPAL 520, Pluronic P123, Triton X-100, and the like, into a co-solvent system with cyclohexane as the mother solvent and TEOS or TMOS as the immiscible solvent. Once the micelle is formed, then ammonia may be added to the system for further hydrolysis. The thickness of the silica coating may be controlled by varying the amount of TEOS or TMOS, and reaction duration. A dense layer of silica may be deposited on the surface of PQD/polymer composite with the successive hydrolysis of silica precursor.

EXAMPLE 1

A method for preparation of a green quantum dots/ceramic/polymer ternary complex is disclosed herein as below.

Step 1: Dissolve lead bromide (0.4 mmol) and methylammonium bromide (0.4 mmol) in 10 ml DMF and ultrasonicated for 10 min with 480 W sonication powers.

Step 2: Add stabilizing and structure directing agent including 1 mL oleic acid and 0.1 ml oleylamine into the above mixture and ultrasonicated for another 10 min.

Step 3: Heat the anti-solvent toluene (100 ml) to the 50° C. and swiftly injecting the precursor solution into the anti-solvent in the presence of silica precursors.

Step 4: Perform the sol-gel reaction by well mixing silica precursors included (3-Aminopropyl)triethoxysilane (0.43 mmol) and tetramethyl orthosilicate (27 mmol) in the aforementioned anti-solvent.

Step 5: Stir the reaction mixture for 48 hours.

Step 6: Modify the as-synthesized PQD/silica composite powder with triethoxyoctylsilane (TEOOS) (1.3 mmol) for another 24 h, wherein as-synthesized PQD/silica composite powder may be obtained by centrifugation.

Step 7: Mix the PQD/silica composite powder (20 mg) with acrylate based polymer (1 g) in order to obtain the PQD/silica/polymer ternary complex.

Step 8: Grind the PQD/silica/polymer ternary complex by cryomilling with grinding ball size of 20 mm for 5 minutes to obtain a green emitting ternary complex powder with size D50 around 20 μm for further application.

Step 9: Analyze the green emitting ternary complex powder with photoluminescence spectrometer.

Figure 6:
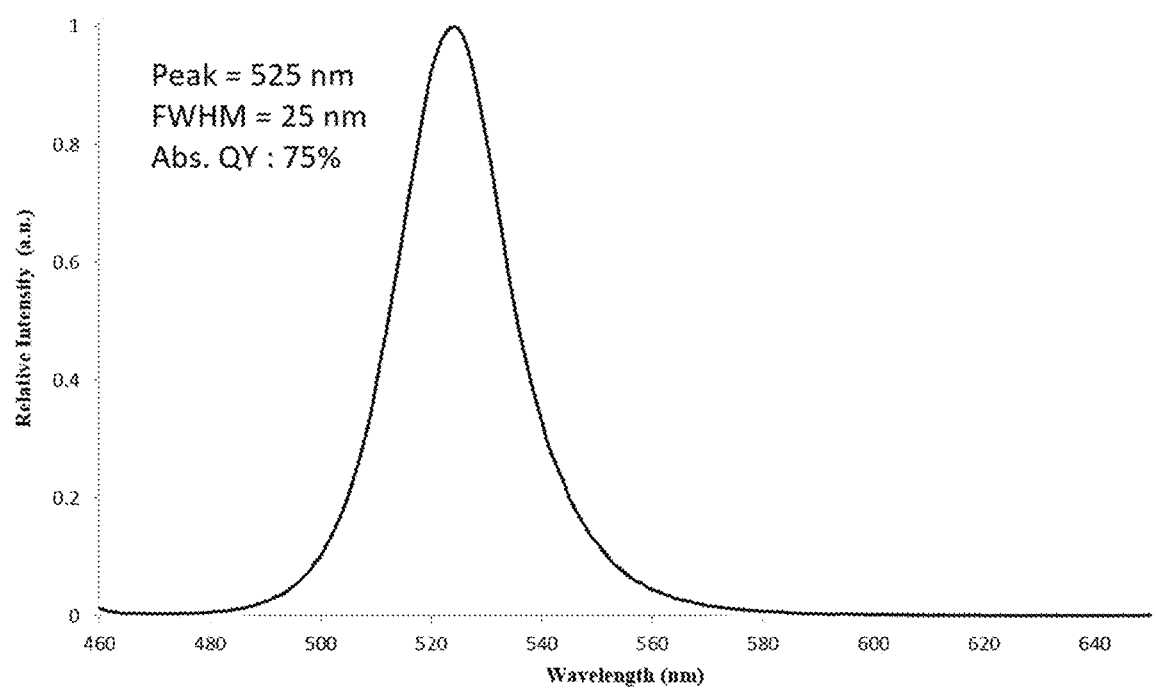
FIG. 6 illustrates an emission spectra of PQD/silica/polymer ternary composite, in accordance with the embodiment of the present application.

Now referring to FIG. 6, an emission spectra of PQD/silica/polymer ternary composite, in accordance with an embodiment of the present application, is illustrated. Peak emission PQD/silica/polymer ternary composite is observed at 525 nm, full-width-half maximum is less than 25 nm and absolute quantum yield is larger than 75%.

Figure 7:
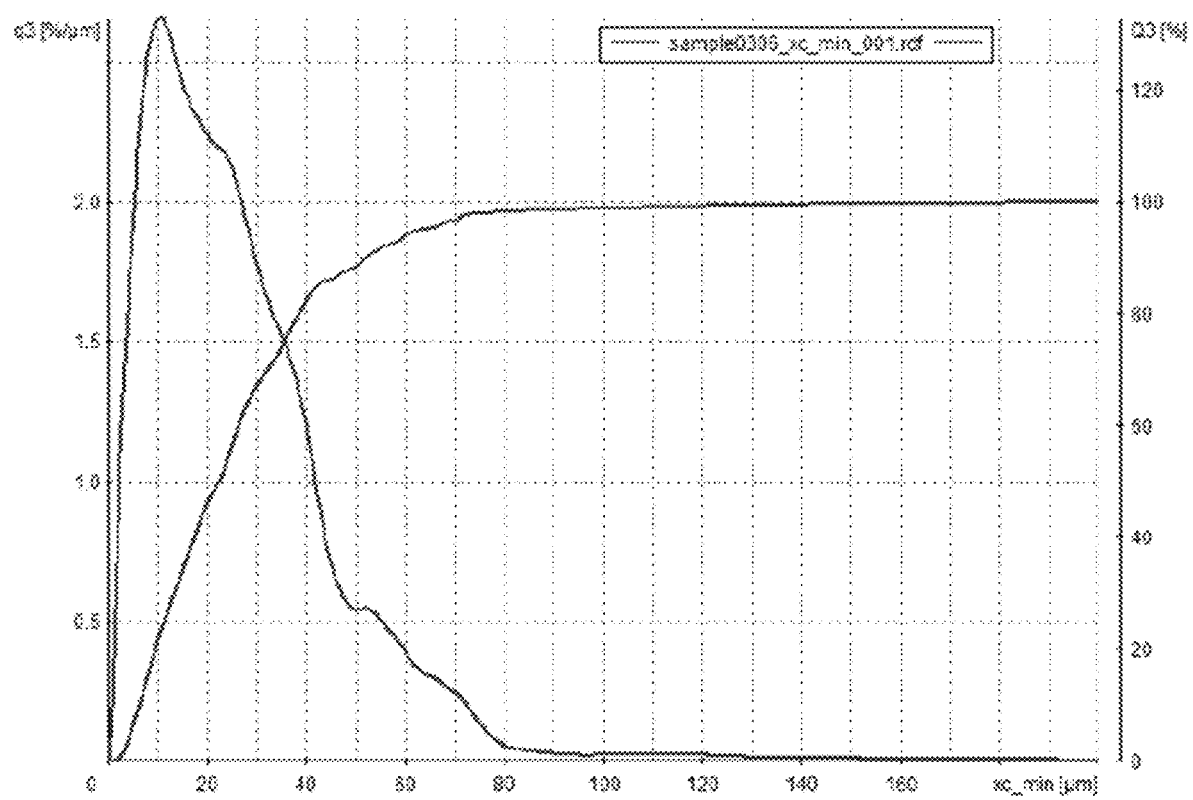
FIG. 7 illustrates a particle size distribution of grinded ternary complex, in accordance with the embodiment of the present application.

Now referring to FIG. 7, a particle size distribution of grinded ternary complex is illustrated, in accordance with an embodiment of the present application. The graph of FIG. 7 represents the distribution on particle size of the grinded sample. Over 50 percent particles are sized less than 20 um. The particle with this size can facilitate the stability of the composite against heat and moisture.

EXAMPLE 2

A method for preparation of a green emitting perovskite quantum dots/polymer/ceramic ternary complex is disclosed herein as below.

Step 1: Dissolve Lead bromide (0.4 mmol) and methylammonium bromide (0.4 mmol) in 10 ml DMF and ultrasonicated for 15 min with 480 W sonication powers.

Step 2: Add stabilizing and structure directing agent including 1 mL oleic acid and 0.5 ml Oleylamine in above mixture and ultrasonicated for another 15 min.

Step 3: Spray the precursor solution into the anti-solvent toluene (100 mL) with 5 g dissolved PMMA.

Step 4: Dry the reaction mixture with rotary evaporation in order to obtain a polymer lump and further the polymer lump hot pressed at 120° C. with a 100 μm spacer in order to obtain polymer film.

Step 5: Grind the polymer film by cryomilling with milling ball sized 20 mm and obtain the PQD/polymer powder with particles sized between D50 to 20 μm.

Step 6: Modify the PQD/polymer powder by sol-gel reaction with tetramethyl orthosilicate (30 mmol) and triethoxyoctylsilane (1 mmol) in order to obtain the green emitting perovskite quantum dots/polymer/ceramic ternary complex.

EXAMPLE 3

A method for preparation of red emitting perovskite quantum dots/polymer composite is disclosed herein as below.

Step 1: Dissolve caesium carbonate (0.5295 g, 1.625 mmol) in a mixture of octadecene (24 mL) and oleic acid (2 mL, 2.8 mmol) at 120° C. in order to prepare Caesium precursor's solution.

Step 2: Dissolve Lead iodide (0.5021 g, 1.1 mmol) in octadecene (25 mL) under nitrogen environment, then add oleic acid (2.5 mL) and oleylamine (2.5 mL) heated at 70° C., which is stirred until lead iodide completely dissolved.

Step 3: Swiftly inject caesium precursors (4 mL) into reaction mixture at 120° C. and then the solution is immediately quenched by immersion of the flask into ice bath.

Step 4: Add methyl acetate (70 ml) in to the quenched reaction mixture and centrifuged at 12500 rpm for 5 min.

Step 5: Discard the residue to obtain supernatant as red perovskite solution having emission peak at 646 nm with a FWHM of 38 nm.

Step 6: Spray the supernatant in to 100 ml toluene with 5 g dissolved PMMA.

Step 7: Remove the solvent under vacuum oven at 40° C. to obtain red perovskite PMMA composite.

Step 8: Grind the perovskite composite to 0.1 um-20 um powder by cryomilling in order to obtain red emitting perovskite quantum dots/polymer composite.

Figure 8:
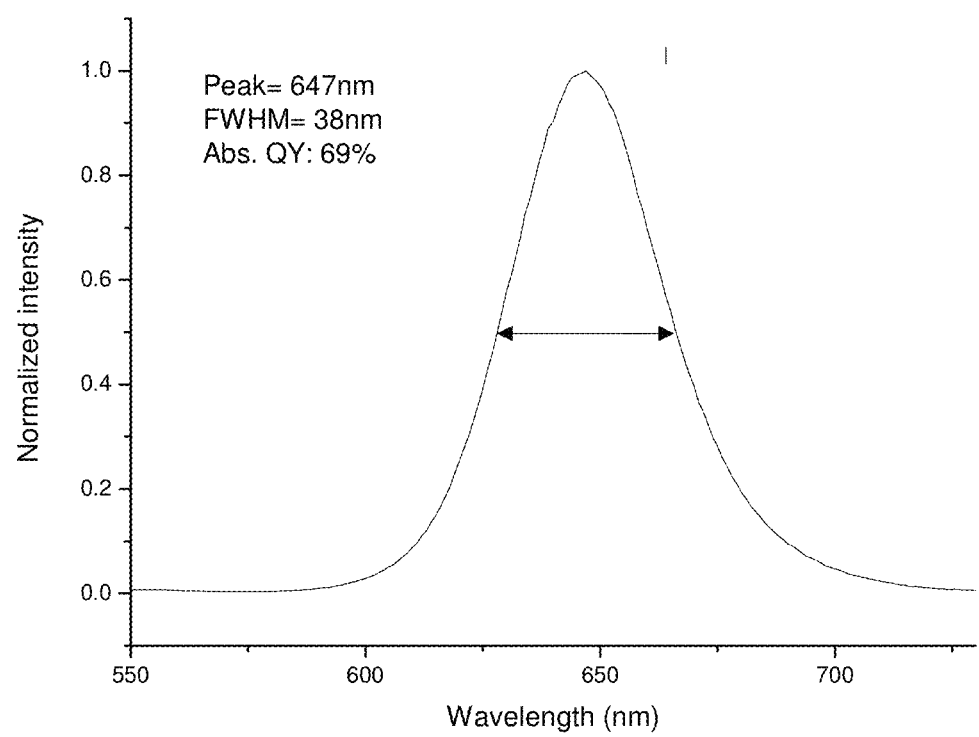
FIG. 8 illustrates an emission spectrum of as-prepared red perovskite quantum dots/polymer composite, in accordance with the embodiment of the present application.

Now referring to FIG. 8, an emission spectrum of as-prepared red perovskite quantum dots/polymer composite is illustrated, in accordance with an embodiment of present application. The red perovskite composite exhibited an emission peak located at 647 nm with FWHM around 38 nm. The absolute quantum yield of the composite can be attained at 69% which indicate an excellent photophysical properties of the composite.

EXAMPLE 4

A method for preparation of green emitting perovskite quantum dots/polymer composite by electric field assisted extrusion is disclosed herein as below.

Step 1: Dissolve Lead bromide (0.2 mmol) and methylammonium bromide (0.25 mmol) in 10 ml DMF and ultrasonicated for 15 min with 480 W sonication powers.

Step 2: Add stabilizing and structure directing agent including 1 mL oleic acid and 0.1 ml Oleylamine into the above mixture and ultrasonicated for another 15 min, wherein PVDF (3 g) is dissolved into the above mixture for 1 h at 100° C.

Step 3: Electrospun the precursor solution with 30 kV applied electric field, wherein the platform is rotated at speed 300 rpm and the precursors is injected with rate 1 mL/min.

Step 4: Collect the polymer film and perform annealing for 24 h.

Step 5: Analyze the polymer film.

Step 6: Grind the polymer film with cryo-milling in order to obtain polymer powder with particle size around 1-20 μm.

Step 7: Apply silica coating on the polymer powder with sol-gel reaction in order to protect the polymer powder.

Figure 9:
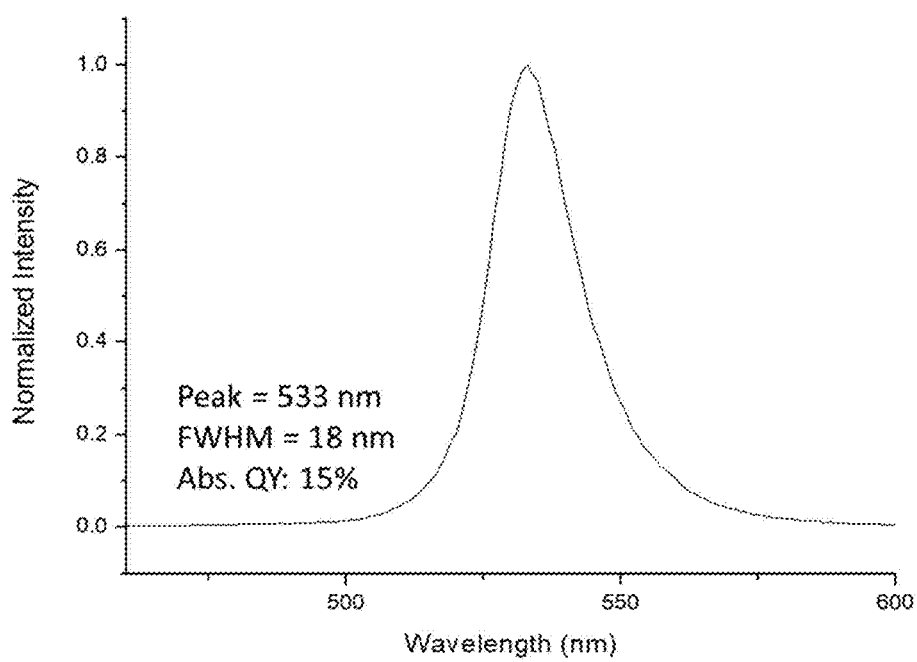
FIG. 9 illustrates an emission spectrum of green emitting perovskite quantum dots/PVDF film, in accordance with an embodiment of the present application.

Now referring to FIG. 9 an emission spectrum of green emitting perovskite quantum dots/PVDF film, is illustrated in accordance with the present application. The peak of emission is observed at 533 nm with FWHM at 18 nm. The absolute quantum yield is measured is 15%.

Figure 10:
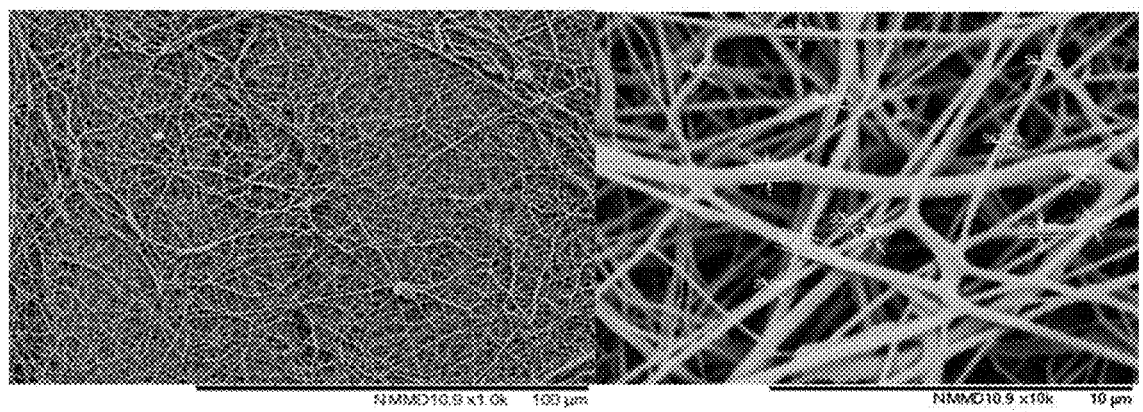
FIG. 10 illustrates SEM image of the green emitting perovskite quantum dots/PVDF film, in accordance with the embodiment of the present application.

Now referring to FIG. 10 SEM image of the green emitting perovskite quantum dots/PVDF film, is illustrated in accordance with the present application. The SEM image is a magnified image of the perovskite cooperated nanofiber with diameter around 30 nm. The porous structure of nanofiber provides void spaces for encapsulation of perovskite QD.

EXAMPLE 5

A method for preparation of green and red emitting polymer film for display application is disclosed herein as below.
Step 1: Add as prepared green ternary complex powder (50 mg) and red ternary complex powder (10 mg) to UV curable acrylate based adhesive and well mixed through planetary and centrifugal mixture.
Step 2: Fabricate the film from the above mixture through doctor blade coating method, wherein the thickness of the film is controlled 80-120 μm.
Step 3: Analyze the film with PL spectrometer and an emission spectrum of green and red emitting polymer film is observed.

Figure 11:
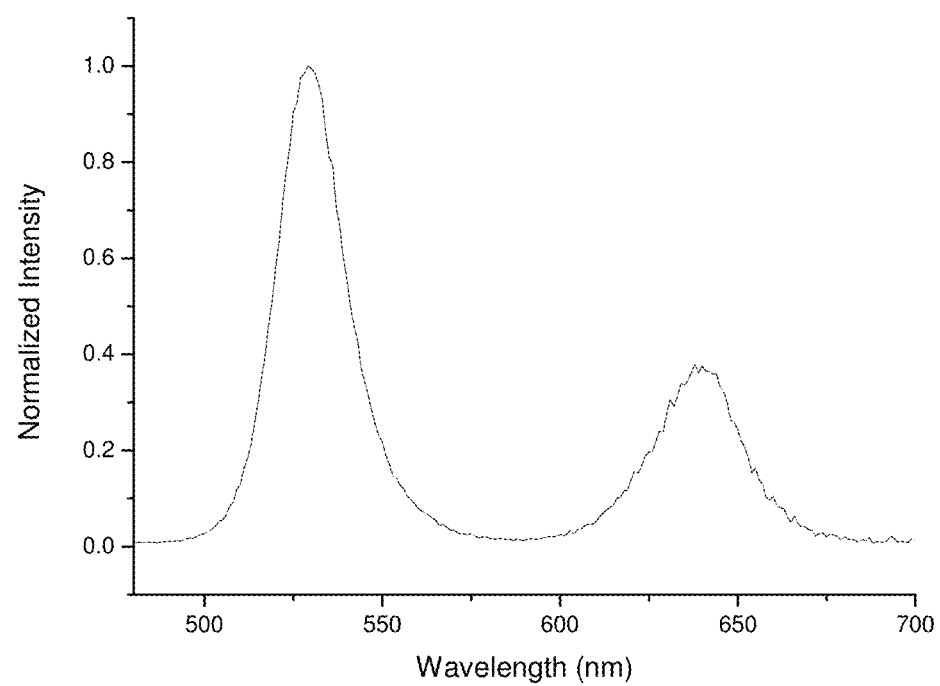
FIG. 11 illustrates an emission spectrum of green and red composite in UV curable acrylate based adhesive, for color conversion film, in accordance with the embodiment of the present application.

Now referring to FIG. 11, an emission spectrum of green and red composite in UV curable acrylate based adhesive, for color conversion film, is illustrated in accordance with an embodiment of the present application. The film may be employed for color conversion layer for a tablet to provide display with high color gamut space. The color space of the display is further analyzed with 450 nm blue light excitation.

Figure 12A:
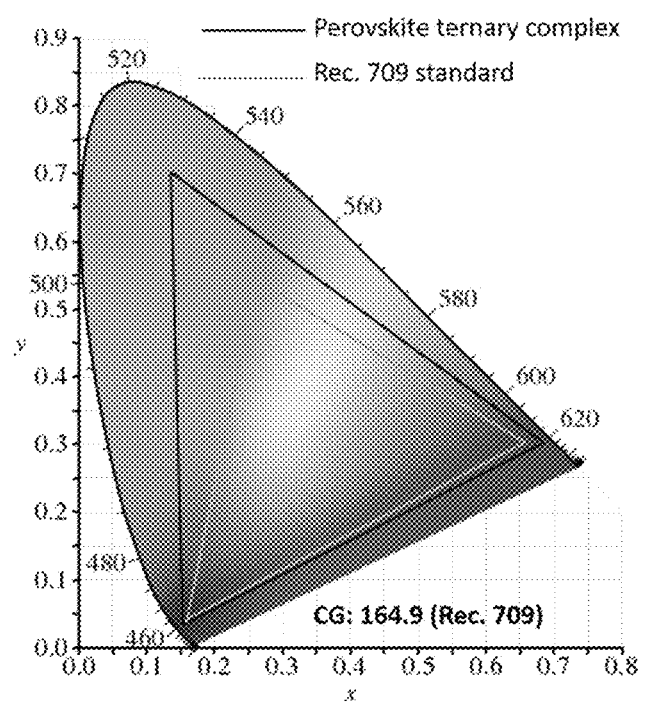
FIGS. 12a-12b illustrates color space and white point position of the color conversion film, in accordance with the embodiment of the present application.
Figure 12B:
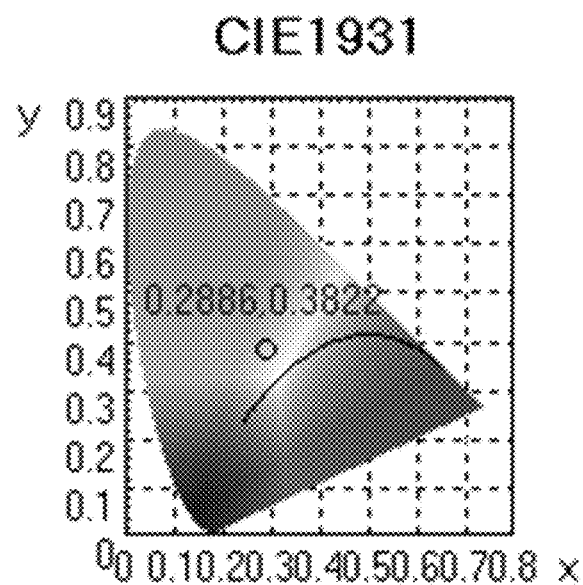

Now referring to FIG. 12a-12b, color space and white point position of the color conversion film is illustrated in accordance with an embodiment of the present application. The obtained color space is 164.9% when compared with Rec.709 color space standard.

In the commercial display, the white LED is cooperated with LCD color filter to provide RGB color. Therefore, the commercial display possesses a broad FWHM of green and red light. Besides, the light intensity is reduced due to some loss but the color filter cutoff. Whereas, in contrast, the perovskite QD film having an extremely narrow FWHM (<25 nm) and high quantum yield (>75%) in film provides purer color and higher light intensity. As a result, the display employed the perovskite QD film as color conversion layer can highly promote the performance of the display.

Some embodiments of the present application may promote stability of perovskite quantum dots. The stability of perovskite quantum dots mainly depends on the ceramic coating and the size of polymer complex. The polymer complex may provide an extra elasticity to the perovskite structure and compatibility towards other materials. The polymer complex may promote the moisture resistance of the perovskite quantum dots, due to hydrophobic property of the polymer complex. The size of the polymer complex may be controlled from 0.1-50 um to facilitate compatibility of the polymer complex with other substrate including ceramic coating or other adhesive for film fabrication. In addition, the polymer complex size may be chosen from 0.1-50 um range to provide sufficient protection to the perovskite quantum dots from moisture.

Some embodiments of the present application may provide extra thermal stability to perovskite quantum dots by employing ceramic coating. The ceramic coating may provide an extra rigidity to the structure due to higher hardness of the ceramic materials. When heat applying to perovskite quantum dots, provide extra energy to the crystalline structure and cause deformation of the structure. The deformation of the structure may quench the light emission properties and cause the drop in photoluminescence performance. The ceramic coating may be applied to perovskite structure to enhance thermal resistance and to tackle the thermal stability problem. The thickness of the ceramic coating may be controlled at the range from 10-50 nm, wherein the thickness provides the best performance balance between photoluminescence properties and stability. In addition, as the refractive index of the ceramic coating is different from the polymer matrix, which may improve the light diffraction during application. Furthermore, the surface of ceramic coating may be also further modified with different ligand to promote the compatibility of the complex towards different materials.

Some embodiments of the present application may control the amount of polymer complex from the range 1-20% to ensure the performance of the color conversion material applications. The amount of this range may be varied to achieve different applications. Furthermore, the higher concentration of polymer complex may promote the stability of the perovskite quantum dots since the higher concentration restricted the crystalline movement in the polymer matrix which can promote the crystalline stability to prevent premature degradation of perovskite quantum dots.

Some embodiments of the present application may vary the sequence of the coating during the preparation of ternary complex to facilitate the complex for different application scenario. In one exemplary embodiment, the perovskite quantum dots may be protected with ceramic coating first and further coated with polymer to obtain the perovskite/ceramic/polymer ternary complex. The perovskite/ceramic/polymer ternary complex may be applied to quantum dots in-chip application where the polymer coating may promote the compatibility of complex towards the encapsulant for LED fabrication. Furthermore, the size of the complex may be fine-tuned at 1-10 um, which may promote the light diffraction efficiency and promote the light emission performance. In contrast, the size cannot be too large, because the complex may block the light emitted from the LED.

In another exemplary embodiment, the perovskite quantum dots may be protected with polymer coating first and followed by ceramic coating to obtain the perovskite/polymer/ceramic ternary complex. The perovskite/ceramic/polymer ternary complex may be applied in quantum dots on panel application. The polymer may provide extra protection to the perovskite QD against moisture as the application of film may present in a relative high humidity condition. The polymer coating may promote the moisture reliability for the perovskite quantum dots. The polymer complex may be further coated with ceramic coating, which may improve the thermal stability of the perovskite/polymer/ceramic ternary complex. In addition, the ceramic coating may be further surface modified with ligand that can further improve the compatibility of the ternary complex in adhesive for film fabrication. Also, the ceramic coated complex may be worked as dispersion medium to enhance the light emission efficiency.

Figure 13A:
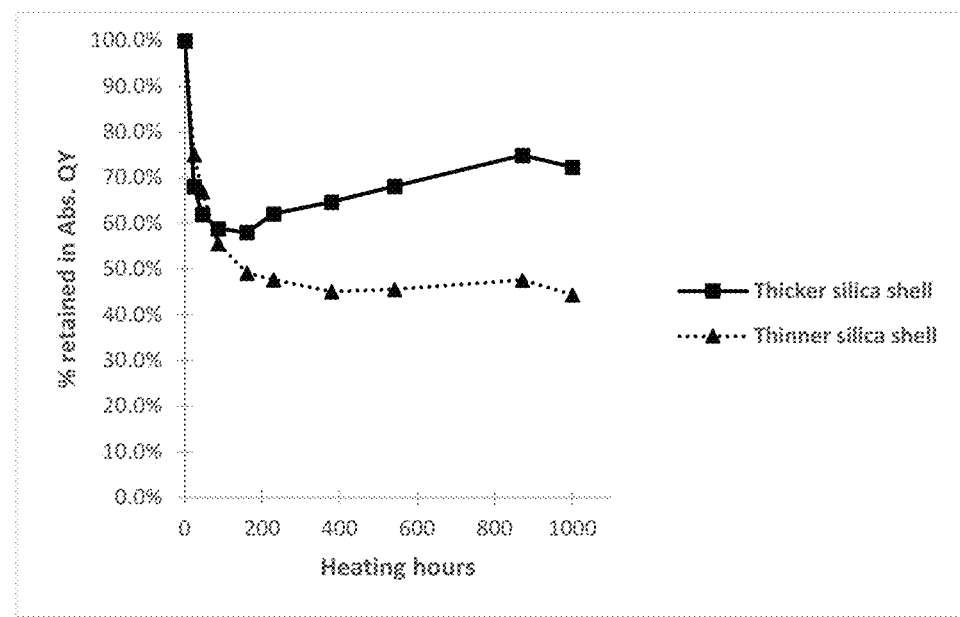
FIGS. 13a-13c illustrates retention of Absolute quantum yield (Abs. QY) of PQD/silica/polymer tertiary composite thin film with different shell thickness upon 50° C. & 50% RH, with different shell thickness upon blue light illumination, with different surface-modified silanes upon blue light illumination respectively, in accordance with the embodiment of the present application.

Reliability Test Results:
Now referring to FIG. 13a, retention of Absolute quantum yield (Abs. QY) of PQD/silica/polymer tertiary composite thin film with different shell thickness upon 50° C. & 50% RH, is illustrated in accordance with an embodiment of the present application. The PQD/silica/polymer tertiary composite thin films may be exhibited high absolute quantum yield (Abs. QY) in the range of 75-80%. This may provide a high color purity to highly promote the color gamut of the display. The thermal stability and photo-stability of composite films may be further promoted on both thinner and thicker silica shell PQD/silica composites. The thickness of the silica shell may be controlled by the duration of silica sol-gel reaction. The thermal stability may be examined by the by monitoring the Abs. QY after continuous heating (50° C., 50% RH; 1000 hr). The thicker silica shell shows a Abs. QY retention of 72% after 1000 hours continuous heating, whereas the thinner shell shows a reduced retention at the end of heating 1000 hours (~44%).

Figure 13B:
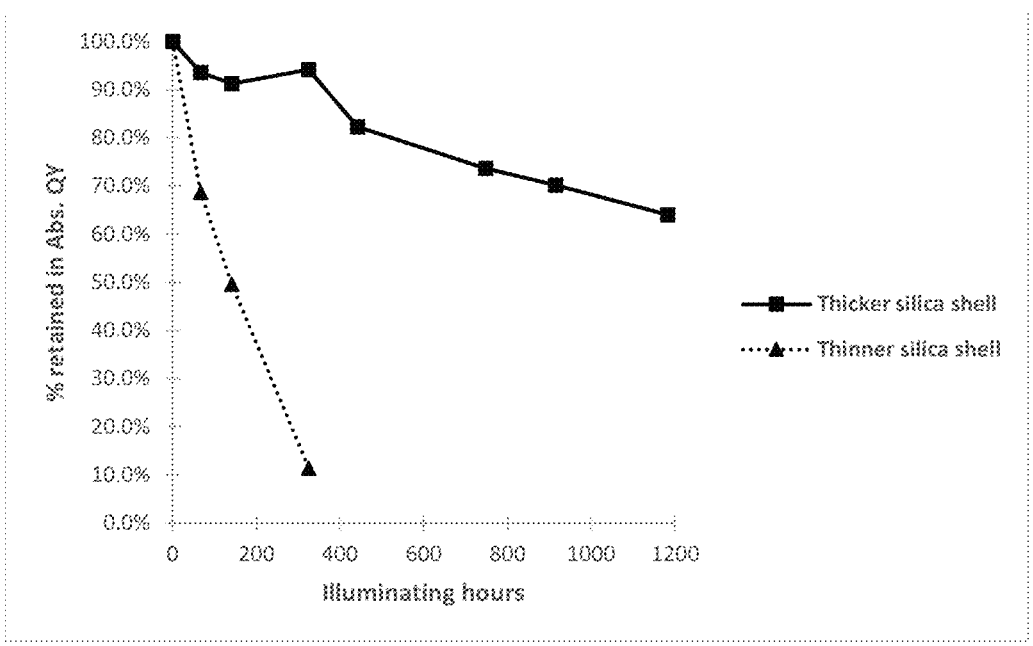

Now referring to FIG. 13b, retention of Absolute quantum yield (Abs. QY) of PQD/silica/polymer tertiary composite thin film with different shell thickness upon blue light illumination, is illustrated in accordance with an embodiment of the present application. The photo-stability is revealed by monitoring the Abs. QY after continuous blue light irradiation (>50 W/m$^2$, 1100 hr). The thicker shell again showed Abs. QY retention of 64% after 1100 hours, whereas the thinner shell resulted in significant decrease in Abs. QY retention to 11% just after 300 hours. The thick silica ceramic here functions as a barrier to isolate PQDs from ambient oxygen and water, in tertiary composite of the present application. This double encapsulation may be expected to allow the long-term stability for high-quality displaying and lighting.

Figure 13C:
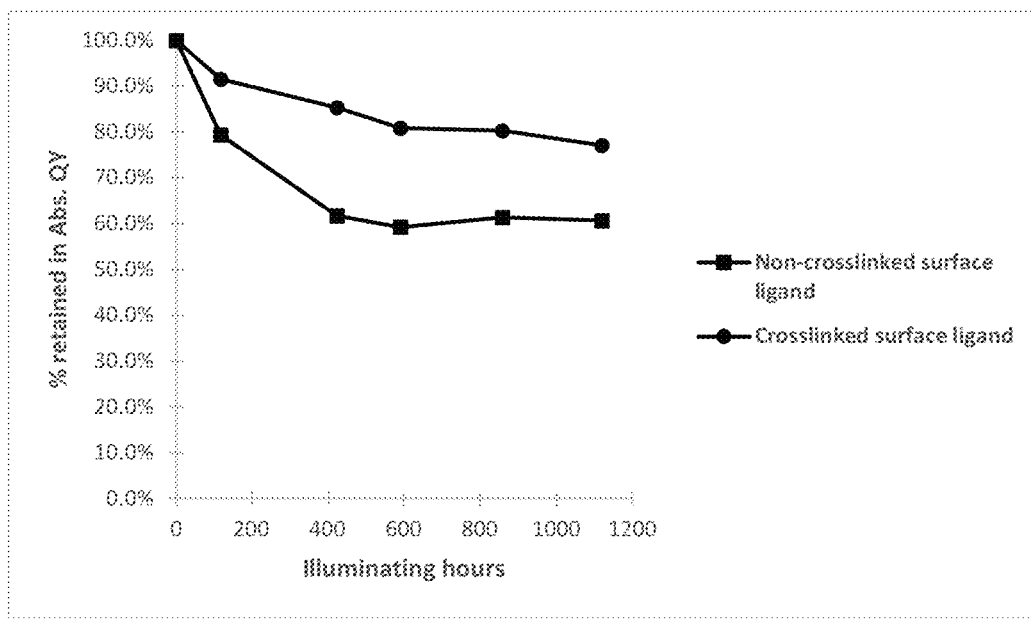

Now referring to FIG. 13c, retention of Absolute quantum yield (Abs. QY) of PQD/silica/polymer tertiary composite thin film of different surface-modified silanes upon blue light illumination, is illustrated in accordance with an embodiment of the present application. The change of surface modified silane may be resulted in an improved photo-stability of the PQD composite film. The use of TEOOS may be replaced by [3-(methacryloyloxy)propyl] trimethoxysilane (cross-linked surface ligand). The polymerized functional group in the cross-linked surface ligand covalently linked the PQD composite and polymer via photo-initiator during UV-curing, resulting in a better compatibility for the PQD/silane composite with the UV-curable polymer. Hence, the enhanced retention Abs. QY (i.e. 77%) was observed after 1100 hours illumination, against 60% from PQD composite with non-cross-linked surface ligand. This may further promote the quantum efficiency and long-term stability for a color conversion layer in display application under blue LED light.

Based on above discussed embodiments of the present application, the PQD/polymer/ceramic ternary complex may be successfully prepared with several advantages including but not limited to:
1. Promoting the thermal stability and moisture resistivity of the perovskite quantum dots;
2. Reducing the cost and time for the PQD-polymer composite preparation; and
3. Promoting the compatibility with various substrates.

We claim:

1. A method for preparation of perovskite quantum dot (PQD)/polymer/ceramic ternary complex, comprising steps of:
   dissolving precursors in an aprotic solvent in order to form a precursor solution;
   spraying the precursor solution into an anti-solvent containing a polymer in order to obtain a mixture;
   drying the mixture, under heat and vacuum, to remove an excess aprotic solvent from the mixture for obtaining a dry perovskite quantum dots/polymer composite;
   grinding the dry perovskite quantum dots/polymer composite, via cryomilling, in order to obtain a PQD/polymer powder; and
   coating the PQD/polymer powder with ceramic using sol-gel reaction for obtaining a PQD/polymer/ceramic ternary complex powder.

2. The method of claim 1, wherein the precursors comprises at least one of a group IV metal halide, methylammonium/cesium halide, a structure directing agent and stabilizing agent, wherein the group IV metal halide comprises at least one of PbCl2, PbBr2 and PbI2, wherein the methylammonium/cesium halide comprises at least one of methylammonium chloride, methylammonium bromide and methylammonium iodide, cesium chloride, cesium bromide and cesium iodide, and wherein the structure directing agent and stabilizing is one of oleylamine, oleic acid, myristic acid, and stearic acid.

3. The method of claim 2, wherein the total amount of the precursors is in the range from 1-20% of the mixture.

4. The method of claim 1, wherein the aprotic solvent is selected from N,N-dimethylformamide or acetonitrile.

5. The method of claim 1, wherein the anti-solvent containing the polymer is obtained by dissolving the anti-solvent into a polymer substrate at a temperature ranging from 25° C. to 70° C., wherein the anti-solvent is selected from a group consisting of hexane, cyclohexane, ethyl acetate, chloroform, dichloromethane, toluene, and xylene.

6. The method of claim 1, wherein the polymer is selected from a group consisting of poly(methyl methacrylate), poly (ethyl methacrylate), and poly(ethylene terephthalate).

7. The method of claim 1, wherein the dry perovskite quantum dots/polymer composite is hot pressed at a temperature ranging from 100° C.-150° C. based upon the polymer substrate.

8. The method of claim 1, wherein the dry perovskite QD/polymer composite is grinded, in a cryo-mill, to the PQD/polymer powder with a particle size ranging from 0.1-50 μm, wherein grinding ball size, of the cryo-mill, ranges from 1-10 mm and grinding time ranging from 3-10 min.

9. The method of claim 1, wherein the coating of the ceramic on the PQD/polymer powder is configured to resist the deformation of a structure of the perovskite quantum dots/polymer and to promote the environmental stability.

10. The method of claim 1, wherein the ceramic, for coating, is at least one of silica, alumina, and kaolinite, wherein the ceramic is coated with a reverse micelle method in the presence of surfactant and catalysed with weak base, wherein the thickness of ceramic coating ranges from 10-50 nm, wherein the thickness is controlled in order to provide optimal protecting effect towards perovskite/polymer composite.

11. The method of claim 1, wherein the ceramic coating is further modified with a single layer of a silane-type ligand selected from a group consisting of (3-aminopropyl)triethoxysilane, triethoxy(octyl)silane, triethoxycaprylsilane, and 3-(Trimethoxysilyl)propyl methacrylate, wherein the silane-type ligand exhibits a crosslinking effect with the adhesive matrix selected from a group consisting of epoxy, acrylate and silicone in order to promote the stability of ternary complex towards heat, moisture and high intensity blue light.

12. A method for preparation of perovskite quantum dot (PQD)/ceramic/polymer composite ternary complex, comprising steps of:
dissolving precursors in an aprotic solvent in order to form a precursor solution;
spraying the precursor solution into an anti-solvent containing a ceramic precursor in order to obtain a perovskite QD/ceramic matrix, wherein a coating of the ceramic ranges from 10-50 nm;
suspending the perovskite QD/ceramic matrix into a polymer matrix with a weight percentage ranging from 1-20% in order to obtain a mixture;
removing an excess aprotic solvent from the mixture, to obtain a perovskite QD/ceramic/polymer composite; and
grinding the perovskite quantum dots/ceramic/polymer composite, via cryomilling, in order to obtain a perovskite quantum dot (PQD)/ceramic/polymer composite ternary complex powder.

13. The method of claim 12, wherein the precursor comprises at least one of a group IV metal halide, methylammonium/cesium halide, a structure directing agent and stabilizing agent, wherein the group IV metal halide comprises at least one of PbCl2, PbBr2 and PbI2, wherein the methylammonium/cesium halide comprises at least one of methylammonium chloride, methylammonium bromide and methylammonium iodide, cesium chloride, cesium bromide and cesium iodide, and wherein the structure directing agent and stabilizing is one of oleylamine, oleic acid, myristic acid, and stearic acid.

14. The method of claim 12, wherein the aprotic solvent is selected from N,N-dimethylformamide or acetonitrile.

15. The method of claim 12, wherein the anti-solvent is selected from a group consisting of hexane, cyclohexane, ethyl acetate, chloroform, dichloromethane, toluene, and xylene.

16. The method of claim 12, wherein the ceramic precursor is selected from a group consisting of tetraethyl orthosilicate, tetramethyl orthosilicate, and 3-(trimethoxysilyl) propyl methacrylate, wherein a mixture of the precursor solution and the anti-solvent containing the ceramic precursor is incubated at 25° C.-60° C. for 1-72 hours after spraying of the precursor solution in order to facilitate the growth of ceramic layer.

17. The method of claim 12, wherein the polymer is selected from a group consisting of poly(methyl methacrylate), poly (ethyl methacrylate), and poly(ethylene terephthalate).

18. The method of claim 12, wherein the perovskite QD/ceramic/polymer composite ternary complex is grinded, in a cryo-mill, to powder with a particle size ranges from 0.1-50 μm, wherein the grinding ball size, of the cryo-mill, ranges from 1-10 mm and grinding time ranging from 3-10 min.

19. A method for preparation of perovskite quantum dot (PQD)/polymer/ceramic composite ternary complex, comprising:
dissolving a polymer and precursors in an aprotic solution in order to prepare a precursor/polymer solution, wherein the precursors weight percentage ranges from 1-20%;
performing an electric field assisted extrusion of the precursor/polymer solution in order to form a liquid jet, wherein the liquid jet is collected over a surface
removing an excess aprotic solvent from the liquid jet in order to obtain a thin film of a perovskite quantum dots/polymer, wherein a thickness of the thin film of the perovskite quantum dots/polymer ranges from 50-300 μm;
grinding, via cryomilling, the thin film of the perovskite quantum dots/polymer in order to obtain the perovskite quantum dots/polymer powder with a particle size ranging from 0.1 to 50 μm; and
depositing a ceramic coating with a thickness ranging from 10-50 nm on the perovskite quantum dots/polymer powder in order to obtain the perovskite quantum dot (PQD)/polymer/ceramic composite ternary complex.

20. The method of claim 19, wherein the thickness of polymer film is varied by varying the parameters of the polymer selected from a group comprising polymer properties, precursor solution properties and instrument properties.

21. The method of claim 19, wherein the polymer is selected from polyvinylidene difluoride (PVDF), polyurethane (PU), and polyvinyl alcohol (PVA), wherein the polymer with a molecular weight range of 50,000-500,000 is dissolved in the aprotic solvent in order to form a polymer solution, wherein the aprotic solvent is at least one of dimethylformaide, tetrahydrofuran, and chloroform.

22. The method of claim 19, wherein the aprotic solvent is selected from dimethylformamide, acetone, and acetonitrile.

23. The method of claim 19, wherein a concentration of the polymer solution is in range of 1-20% for electrospinning and the viscosity is at the range of 1000-2000 cps, and wherein a potential difference for electrospinning is at a range of 15-40 kV with the flow rate of the precursor solution is at range of 0.1-3.5 mL/min.

24. The method of claim 19, wherein perovskite QD/polymer is grinded, in a cryo-mill, to perovskite QD/polymer powder with particle size ranges from 0.1-50 μm, wherein grinding ball size, of the cryo-mill, ranges from 1 to 10 mm and the grinding time ranging from 3-10 min.

25. The method of claim 19, wherein perovskite quantum dots/polymer powder is modified with sol-gel reaction to deposit the ceramic coating, wherein the ceramic coating is configured to resist the deformation of a structure of the perovskite quantum dots/polymer and to promote the enviromental stability.

26. The method of claim 19, wherein the coating of the ceramic is selected from at least one of the silica, alumina, kaolinite coated with a reverse micelle method in the presence of surfactant and catalysed with weak base, wherein the thickness of ceramic coating ranging from 10-50 nm is controlled in order to provide optimal protecting effect towards perovskite/polymer composite.

* * * * *